United States Patent
Kanukollu

(10) Patent No.: US 11,212,101 B2
(45) Date of Patent: Dec. 28, 2021

(54) TOKEN EXCHANGE WITH CLIENT GENERATED TOKEN

(71) Applicant: CA, Inc., New York, NY (US)

(72) Inventor: Ravi Kumar Kanukollu, Hyderabad (IN)

(73) Assignee: CA, INC., New York, NY (US)

( * ) Notice: Subject to any disclaimer, the term of this patent is extended or adjusted under 35 U.S.C. 154(b) by 351 days.

(21) Appl. No.: 16/155,878

(22) Filed: Oct. 9, 2018

(65) Prior Publication Data
US 2020/0112436 A1 Apr. 9, 2020

(51) Int. Cl.
*H04L 9/32* (2006.01)
*H04L 29/06* (2006.01)
*H04L 9/30* (2006.01)

(52) U.S. Cl.
CPC .......... *H04L 9/3213* (2013.01); *H04L 9/3073* (2013.01); *H04L 9/3228* (2013.01); *H04L 63/0853* (2013.01); *H04L 63/0876* (2013.01)

(58) Field of Classification Search
CPC ... H04L 9/3213; H04L 9/3073; H04L 9/3228; H04L 63/0853; H04L 63/0876; H04L 63/0442; H04L 63/0807; H04L 63/0838
See application file for complete search history.

(56) References Cited

U.S. PATENT DOCUMENTS

| 6,895,507 | B1* | 5/2005 | Teppler | H04L 9/3263 713/155 |
| 2003/0028773 | A1* | 2/2003 | McGarvey | H04L 9/3263 713/176 |
| 2004/0111621 | A1* | 6/2004 | Himberger | H04L 67/02 713/182 |
| 2013/0086656 | A1* | 4/2013 | Paddon | H04L 63/0815 726/6 |
| 2017/0195457 | A1* | 7/2017 | Smith, II | H04L 63/166 |
| 2017/0213213 | A1* | 7/2017 | Tomlinson, Jr. | H04W 12/0802 |
| 2018/0139192 | A1* | 5/2018 | Pishinov | H04L 63/0815 |
| 2018/0234464 | A1* | 8/2018 | Sim | H04L 9/3213 |

(Continued)

OTHER PUBLICATIONS

Hardt, "The OAuth 2.0 Authorization Framework", RFC Editor, Internet Engineering Task Force, Oct. 2012, 77 pages, retrieved on Oct. 9, 2018 https://tools.ietf.org/html/rfc6749.

(Continued)

*Primary Examiner* — Robert B Leung
(74) *Attorney, Agent, or Firm* — Foley & Lardner LLP

(57) ABSTRACT

A client can be authenticated with an identity provider. The identity provider can generate an identity provider token after successful authentication. Prior to issuing a request to a service provider, the client can request a temporary (one time use) token from the identity provider. The request may include a client token to verify the client's identity. The identity provider can validate the client token using details saved in the identity provider token and issue the temporary token to the client. The client can provide the temporary token to a service provider in a request for service. The service provider can validate the temporary token with the identity provider. If the temporary token is valid (i.e., has not already been used), the service provider can respond to the request. The use of a temporary token and not sharing the identity provider token with the client can prevent security breaches.

19 Claims, 8 Drawing Sheets

(56) References Cited

U.S. PATENT DOCUMENTS

2019/0312730 A1* 10/2019 Engan .................. H04L 9/3213
2019/0394187 A1* 12/2019 Fletcher ............. H04L 63/0807

OTHER PUBLICATIONS

Moriarty, et al., "PKCS #12: Personal Information Exchange Syntax v1.1", RFC Editor, Internet Engineering Task Force, Jul. 2014, 29 pages, retrieved on Oct. 9, 2018 from https://tools.ietf.org/html/rfc7292.

Sakimura, et al., "OpenID Connect Standard 1.0—draft 21", OpenID, Jul. 5, 2013, 31 pages, retrieved on Oct. 9, 2018 from https://openid.net/specs/openid-connect-standard-1_0-21.html.

* cited by examiner

TOKEN EXCHANGE WITH CLIENT GENERATED TOKEN

BACKGROUND

The disclosure generally relates to the field of information security, and more particularly to interprogram communication or interprocess communication (IPC).

Many software applications make use of information and/or services provided by another software application. In other words, a client application makes use of the services provided by a service provider application. Typically, the client application must be authorized and authenticated to use the service provider. Once such authorization and authentication has taken place, the client may be provided a token that can be used by the client to indicate to the service provider that the client has been authenticated and authorized to access the services provided by the service provider. The client can provide the token to the service provider when making requests of the service provider.

Tokens in the above-described environment are typically long-lived tokens. That is, the tokens do not expire for relatively long periods of time (e.g., hours or days). A problem with the use of such long-lived tokens is that a malicious party may discover the token and then use the token to access information or services that the malicious party is not authorized for. For example, the malicious party may access user profiles or other private information maintained by a service provider. The malicious party may use the token until the token expires, which may not be for a relatively long time.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to client generated tokens in illustrative examples. Aspects of this disclosure can be also applied to tokens that are exchanged between two servers. In other instances, well-known instruction instances, protocols, structures and techniques have not been shown in detail in order not to obfuscate the description.

Overview

Aspects of the disclosure include a client that can be authenticated with an identity provider. After successful authentication, the client that is to issue a request to a service provider can first request a temporary token from the identity provider. The request may include a signed client token to verify the identity of the client. The identity provider can issue the temporary token to the client. The temporary token can be a one-time use token. The client can then provide the temporary token to a service provider as part of a request for service or data from the service provider. The service provider can validate the temporary token with the identity provider. If the temporary token is valid (i.e., it has not already been used or is not expired), the service provider can proceed to respond to the request by providing the requested service or data.

Example Illustrations

Figure 1:
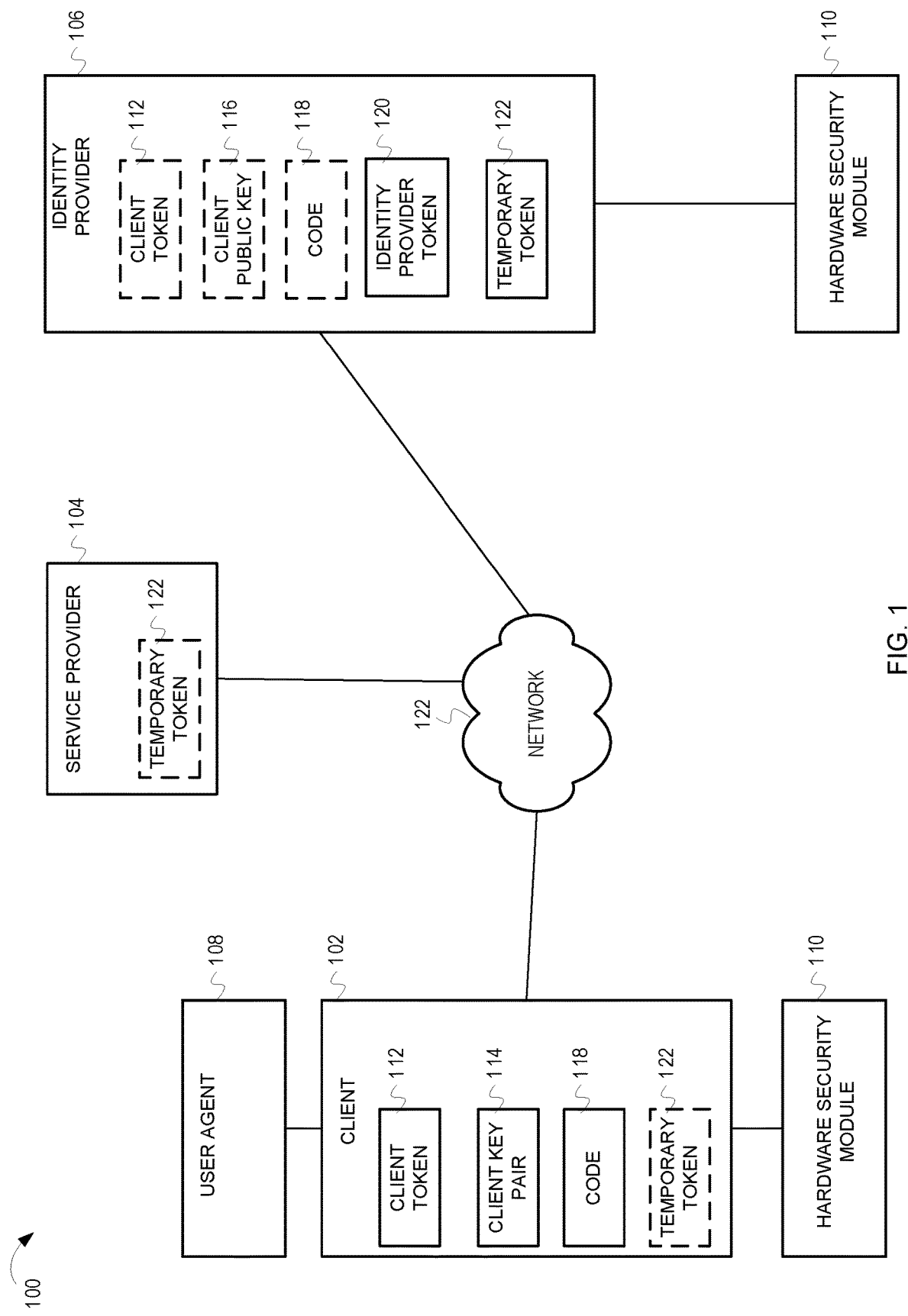
FIG. 1 is a block diagram of a system for token exchange with client generated tokens.

FIG. 1 is a block diagram of a system 100 for token exchange with client generated tokens. In some embodiments, system 100 includes a client 102, a service provider 104, and an identity provider 106.

Client 102 can be any type of application or process that utilizes or consumes services provided by service provider 104. For example, client 102 may issue requests to a service provider to request that the service provider 104 perform some action on behalf of the client 102, or request data maintained by service provider 104. Client 102 can maintain a client key pair 114. In some aspects, client key pair 114 can be a public/private key pair.

In some aspects, a client 102 can utilize a user agent 108 as part of an authentication/authorization process. User agent 108 can be a user interface that provides a way for a user to enter credentials such as a user identification and/or password. In some aspects, user agent 108 can be a browser based user agent that communicates with identity provider 106 such that identity provider 106 can receive the credentials and use the credentials to authorize and/or authenticate the user of a client 102. Other user credentials besides a user identification and password may be used and are within the scope of the inventive subject matter.

Service provider 104 responds to requests from clients such as client 102. For example, service provider 104 can receive a request from client 102. The request may be a request for data maintained or obtained by service provider 104. Alternatively, the request may be a request that the service provider 104 perform some action on behalf of client 102. Service provider 104 can interact with identity provider 106 to determine if the client 102 is authorized to access the services provided by service provider 104.

In some aspects, identity provider 106 can authenticate a client 102 (e.g., authenticate a user of client 102). In addition to, or instead of, username and password identification, identity provider may also use a client public key 116 to authenticate a client 102. Identity provider 106 can generate tokens and provide information to the client 102 or to the service provider 104 regarding details of the client authentication. For example, identity provider 106 can provide event information indicating that a user of client 102 has been authenticated, expiration times of tokens and the details of user attributes such first-name, date of birth, address, phone, department etc. In addition, identity provider 106 can maintain the token information that can be used support a single sign-on behavior for users who can access various client applications other than client 102 in the same user session.

Identity provider 106 can generate and/or utilize different types of tokens. In some aspects, client 102 can generate a client token 112 and provide the client token 112 to the identity provider 106 after client authentication has taken place. The client token 112 can be used to identify the client during subsequent requests made to identity provider 106. Additionally, identity provider 106 can generate a temporary token 122 in response to receiving a request from client 102. In some aspects, the temporary token 122 can be a one-time-use token. Further, the temporary token 122 can be a short-lived token. In some aspects, the identity provider 106 can generate an identity provider token 120. As used herein, a token can be a data structure or data object having one or more data elements. One field of the token can be a token identifier that can uniquely identify the token. Additionally, some or all of the client token 112, temporary token 122, and identity provider token 120 can include various combinations of some or all of the following data elements:

User name information.
User date of birth.
User Address Information.
User phone number(s).
User work department. Other information can be included in data elements of the tokens as desired.

In some aspects, the client 102 and identity provider 106 can utilize keys as part of the token exchange described herein. For example, the client 102 can maintain a public/private key pair. The public key can be shared with the identity provider 106. In some aspects, the client 102 and identity provider 106 can utilize Public Key Cryptography Standard #12 (PKCS12) file sharing in which an encrypted file contains a public/private key pair. The file preferably is encrypted with a strong password. For example, a strong password may contain fifteen characters or more where the characters are mixed case letters, numbers, and symbols. The keys stored in the file may be rolled over every week in order to provide further security.

Additionally, client 102 may maintain a digital certificate. In some aspects, the digital certificate may be shared with the identity provider using JSON (JavaScript Object Notation) Web Key Set (JWKS).

In some aspects, either or both client 102 and identity provider 106 can utilize a hardware security module 110. The hardware security module 110 can be a plug-in card or external network attached module that can store keys and tokens used for encryption, authentication and/or authorization.

The operation of the above-described components will now be described with reference to FIGS. 2-6.

Figure 2:
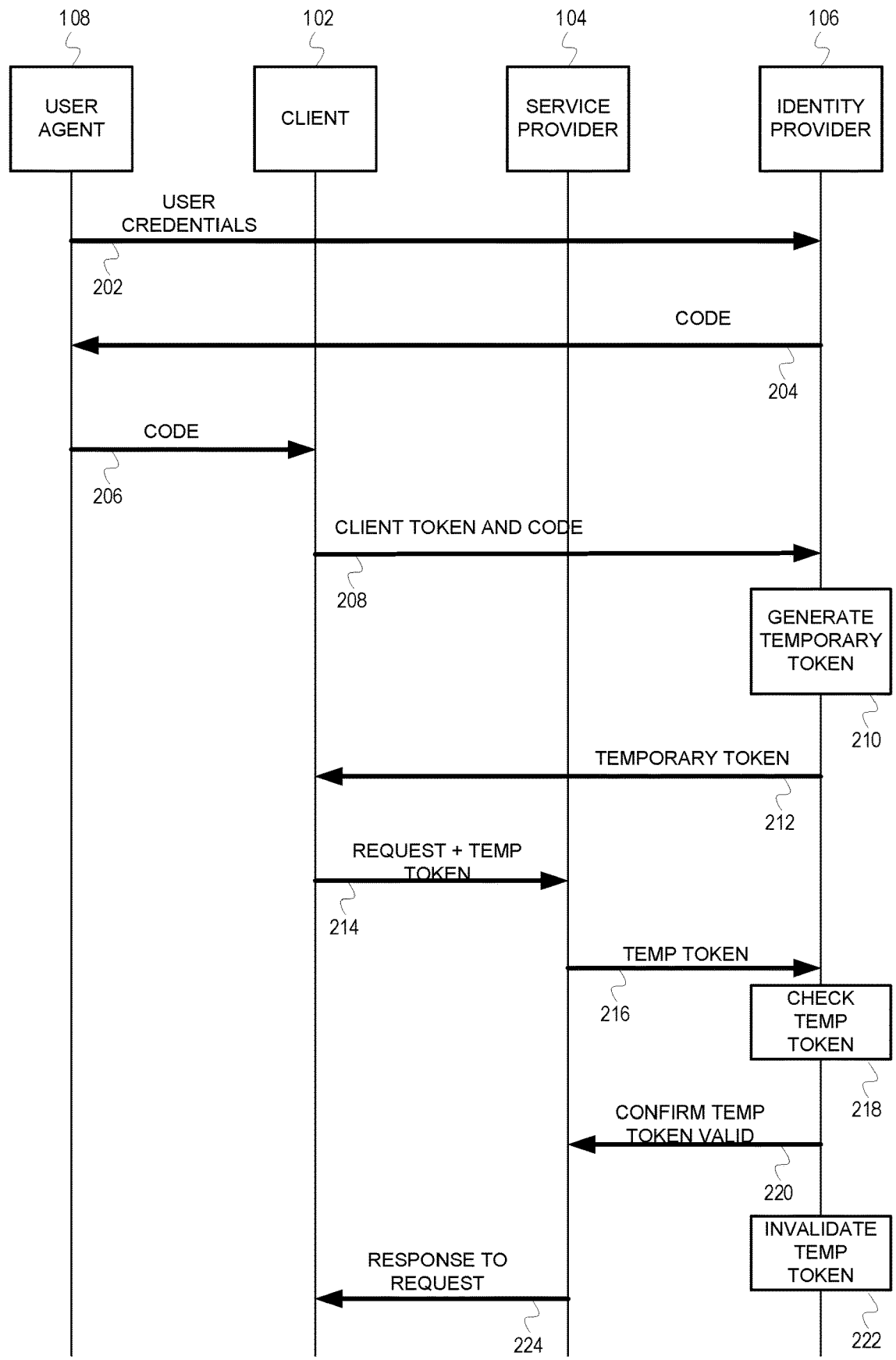
FIG. 2 is a sequence diagram illustrating a method for exchanging tokens with client generated tokens.

FIG. 2 is a sequence diagram illustrating a method for exchanging tokens with client generated tokens. At operation 202, user credentials can be provided to an identity provider 106. In some aspects, a client 102 can cause a user agent to be invoked, where the user agent provides a graphical user interface that provides one or more fields for a user to provide credentials. For example, a user can provide a user identifier and/or a password as user credentials via user agent 108.

At operation 204, in some aspects, the identity provider 106 generates a code and sends the code to the user agent 108 in response to receiving credentials at operation 202. In some aspects, the code can be a random sequence of values. The identity provider 106 can store the code for later use in verifying the client 102.

At operation 206, the user agent 108 can provide the code to client 102.

In alternative aspects, the identity provider 106 can provide the code directly to client 102. In such implementations, operation 206 need not be performed.

In some aspects, operations 202-206 are performed once when a client 102 (potentially including a user agent 108 of a client 102) initially interacts with an identity provider 106. After receiving the code, operations 202-206 need not be repeated by the client 102 and user agent 108.

Operations 208-224 can be performed when a client 102 determines to issue a request to a service provider 104.

At operation 208, the client 102 sends a client token and the code received at operation 204 to the identity provider 106. In some aspects, the client 102 can generate the client token and store the client token in an encrypted form for use in future temporary token requests. In further aspects, the client can sign the client token that is sent to the identity provider 106 along with the code. For example, the client can encrypt the token using a public certificate, and sign the message containing the encrypted token with a private key.

At operation 210, the identity provider 106 generates a temporary token in response to receiving the client token and verifying the code received from client 102 is the same code as sent to the client at operation 206 above. In some aspects, the identity provider 106 can verify the identity and authenticity of the request by verifying the signature of the request message using the public key of the client, and decrypting the client token using the private key.

In some aspects, the temporary token can be a one-time use token. In alternative aspects, the temporary token can be limited for use during a specific brief time interval, for example, an interval of seconds or minutes from when the temporary token was generated.

At operation 212, the identity provider 106 sends the temporary token to the client 102.

At operation 214, the client issues a request for a service or data provided by service provider 104. The client can include the temporary token with the request.

At operation 216, the service provider 104 sends the temporary token to the identity provider 106 to seek an indication that the temporary token is valid.

At operation 218, the identity provider 106 checks the temporary token to determine if it is valid.

In response to determining that the temporary token is valid, at operation 220 the identity provider sends a response to the service provider 104 confirming that the temporary token was valid. If the temporary token was not valid, then the identity provider 106 can send a message indicating that the temporary token was not valid.

At operation 222, the identity provider can invalidate the temporary token. In some aspects, invalidating the temporary token sets an indicator maintained by the identity provider that the temporary token has been used. Because the temporary token can be a one-time use token, the token is no longer considered valid.

If the service provider 104 receives an indication at operation 220 that the temporary token was valid, the service provider 104 can perform the requested service and obtain the requested data. At operation 224, the service provider can send a response to the request to the client 102 that provides the requested data or provides an indication that the requested service was performed. If the temporary token was not valid, the service provider 104 can send a response to the client 102 indicating that the temporary token was invalid.

Figure 3:
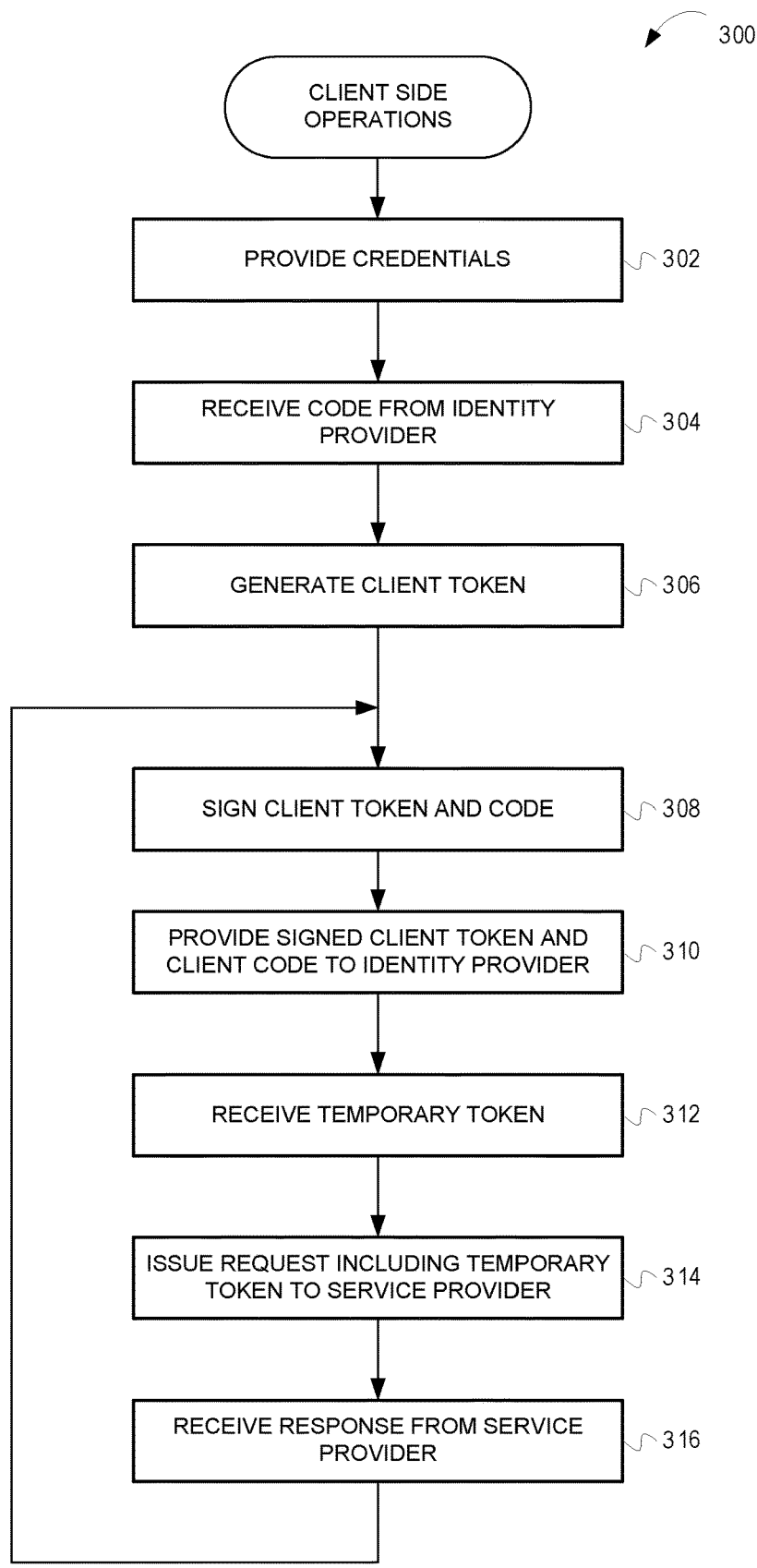
FIG. 3 is a flow chart illustrating operations performed by a client in a method for exchanging tokens.

FIG. 3 is a flow chart 300 illustrating operations performed by a client in a method for exchanging tokens. At block 302, the client 102 can provide credentials to an identity provider 106. For example, the client 102 can provide a username and/or password to the identity provider. In some aspects, a user agent 108 may provide a user interface for a user to enter the username and/or password.

At block 304, the client 102 receives a code from the identity provider 106. The code can be unique to the client and can be used by the identity provider 106 to assist in identifying a particular client 102.

At block 306, the client 102 generates a client token. In some aspects, the client token can be a bearer token that includes data values that can be randomly generated. The client token, like the code, can be used to uniquely identify a particular client 102. The client token can be encrypted after it is generated and prior to storing the client token in a computer-readable medium. In some aspects, the client token and the code can be stored in separate areas of a computer-readable medium or in separate media to minimize the risk that both the client token and code can be obtained by a third party.

The operations of blocks 308-316 can be performed when a client 102 makes a request of a service provider 104. At block 308, the client 102 can optionally digitally sign the client token. Further, the client 102 can optionally encrypt the client token. For example, the client 102 can encrypt the client token with a public certificate and sign the encrypted client token with a private key. The client token and the private key can be stored in separate areas of a computer-readable medium or stored in separate media to avoid theft of both the key and the client token. Further, the keys can be stored in a hardware security module.

At block 310, the client 102 can provide the client token and code (potentially signed and encrypted) to the identity provider. The client token and code can be provided via a network connection or interprocess communication channel between the client 102 and identity provider 106.

At block 312, the client 102 receives a temporary token from the identity provider in response to providing the client token and code. As noted above, the temporary token can be a one-time use token, a token with a limited expiration time (e.g., one minute or less) or both.

At block 314, the client 102 can issue a request to service provider 104. The request can include the temporary token received at block 312.

At block 316, the client 102 receives a response to the request issued at block 314. The response can provide requested data or an indication that an action in the request was performed by the service provider 104.

Figure 4:
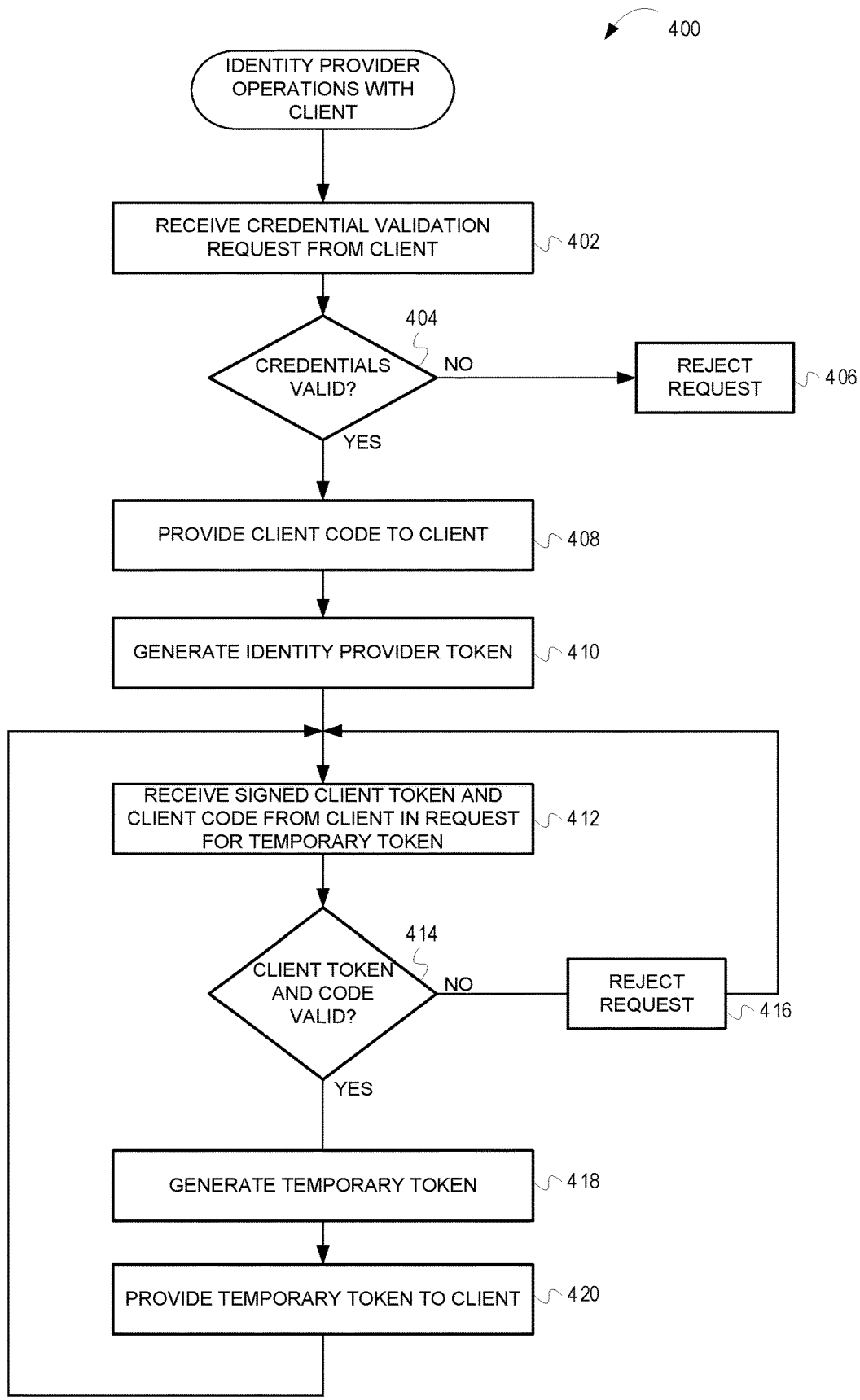
FIG. 4 is a flow chart illustrating operations performed by an identity provider with respect to a client in a method for exchanging tokens.

FIG. 4 is a flow chart 400 illustrating operations performed by an identity provider with respect to a client in a method for exchanging tokens. At block 402 the identity provider 106 receives a credential validation request from a client 102. As indicated above, the credentials received from the client can include a username, password or both.

At decision block 404, the identity provider 106 determines if the credentials received at block 402 are valid. For example, the identity provider 106 can determine if the username is a valid username and the password is a valid password for the username.

If the username or password are not valid, then at block 406 the credentials are rejected. The identity provider 106 can provide a response to the client 102 indicating that the credentials were rejected.

If the username and password are valid, then at block 408, the identity provider 106 generates a code that is unique to the client 102. In some aspects, the code can include a random string. The identity provider then provides the code to the client 102.

At block 410, the identity provider 106 generates an identity provider token. A separate identity provider token can be generated for each client using the services provided by the identity provider 106. In some aspects, the identity provider token can include user attributes associated with a user of client 102 (e.g., user name, user date of birth, user address, user phone numbers and other demographic information). Further, the identity provider token can include details regarding client 102 and authentication events such as when the user was authenticated with the identity provider 106 and a token timeout value for the identity provider token. In some aspects, the client details can include the client name and a client identifier. The client identifier can be any type of identifier that can uniquely identify the client within the system. For example, the client identifier can be a Universally Unique Identifier (UUID). The UUID can also be referred to as a Globally Unique Identifier (GUID). The identity provider token is exclusive to the identity provider. In other words, the identity provider token is not shared with any other entity such as a client or service provider.

At block 412, the identity provider 106 receives a request for a temporary token that includes a signed client token and code from a client 102.

At decision block 414, the identity provider determines if the client token and code are valid. In some aspects, the identity provider 106 validates the signature of the client token using a public certificate associated with a private key of the identity provider. The identity provider can decrypt the client token using the private key associated with the certificate. The identity provider can use the information in the decrypted client token to identify the client, and to verify that the code provided in the request for the temporary token is associated with the client. Further, the identity provider can use information in the corresponding identity provider token for the client to verify that the request for the temporary token is valid.

If the client token can be successfully verified and decrypted, and if the code is properly associated with the client identified by the client token, then the method proceeds to block 418. If the client token cannot be verified or decrypted, then the request for a temporary token is rejected at block 416. The method then returns to block 412 to await receipt of the next request for a temporary token.

Block 418 is reached if the client token and the code are valid. At block 418, the identity provider generates a temporary token. In some aspects, the temporary token can include a user id and details regarding client 102. The temporary token includes data indicating that the temporary token has a limited period of validity. For example, the token can include data indicating that the token is a one-time use token. The temporary token can include information that the token expires after a relatively short period of time (e.g., on five minutes or less). The temporary token can be associated with the client using details regarding the client.

At block 420, the temporary token is provided to the client 102. The method then returns to block 412 to await the next request for a temporary token.

Subsequent requests for temporary tokens from a client 102 can be validated using the client token. Thus, the identity provider 106 does not need to require new credential validation in order to authenticate the client 102 during a session.

Figure 5:
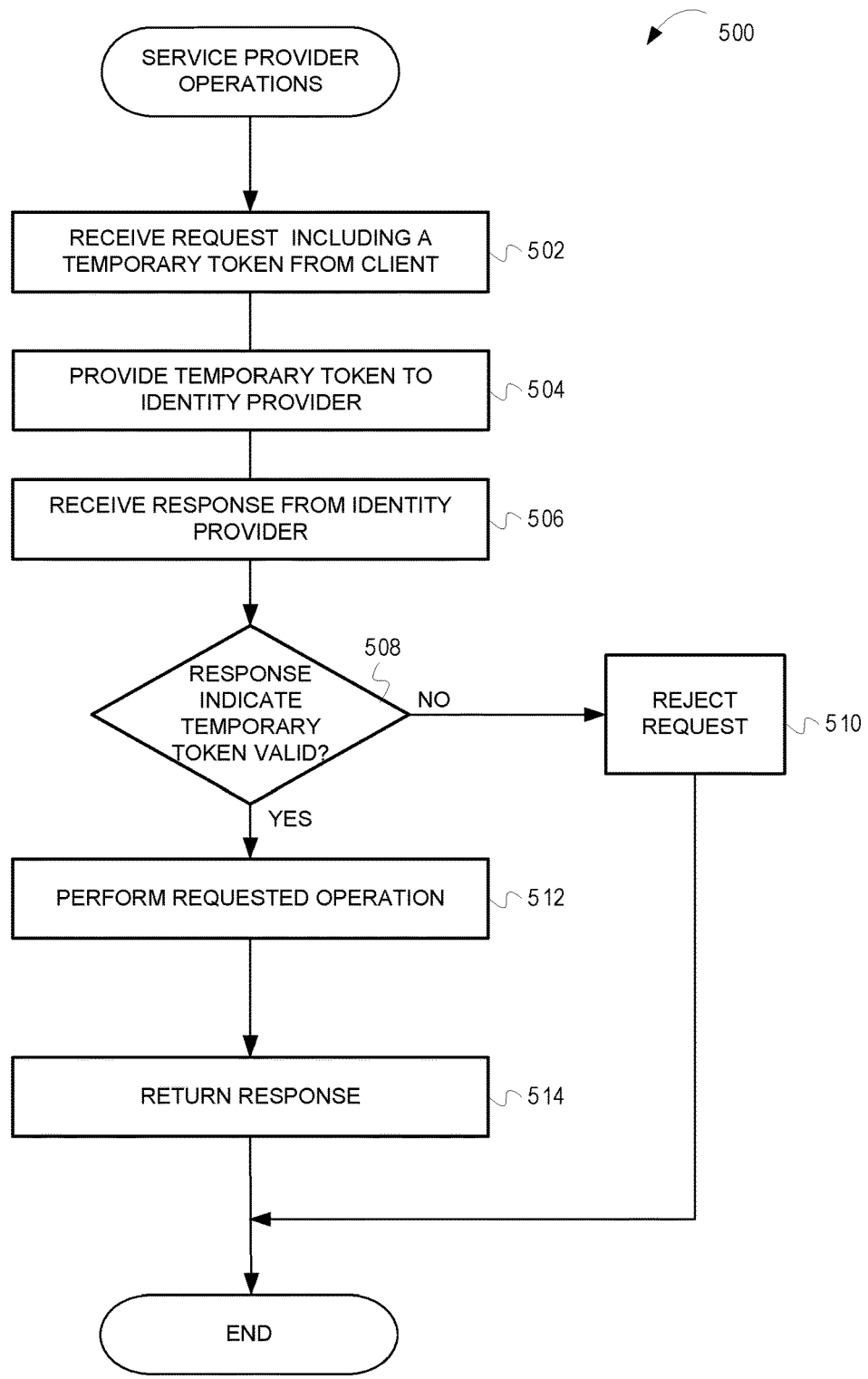
FIG. 5 is a flow chart illustrating operations performed by a service provider in a method for exchanging tokens.

FIG. 5 is a flow chart 500 illustrating operations performed by a service provider in a method for exchanging tokens. At block 502, the service provider 104 receives a service request from a client 102. The service request can include a temporary token.

At block 504, the service provider 104 provides the temporary token to the identity provider in a request for validation of the temporary token.

At block 506, the service provider 104 receives a response from the identity provider 106. The response can indicate whether the temporary token is valid or not.

At decision block 508, if the temporary token is valid, then the method proceeds to block 512. If the temporary token is not valid, then the method proceeds to block 510, where the service provider 104 provides a response to the client 102 indicating that the service request was rejected. The method then ends.

Block 512 is reached if the identity provider indicates that the temporary token is valid. At block 512, the service provider 104 can perform the service requested in the service request. For example, the service provider 104 can provide data requested in the service request, or perform actions or operations requested in the service request.

At block 514, the service provider 104 can return the results of the service request. The method then ends.

Figure 6:
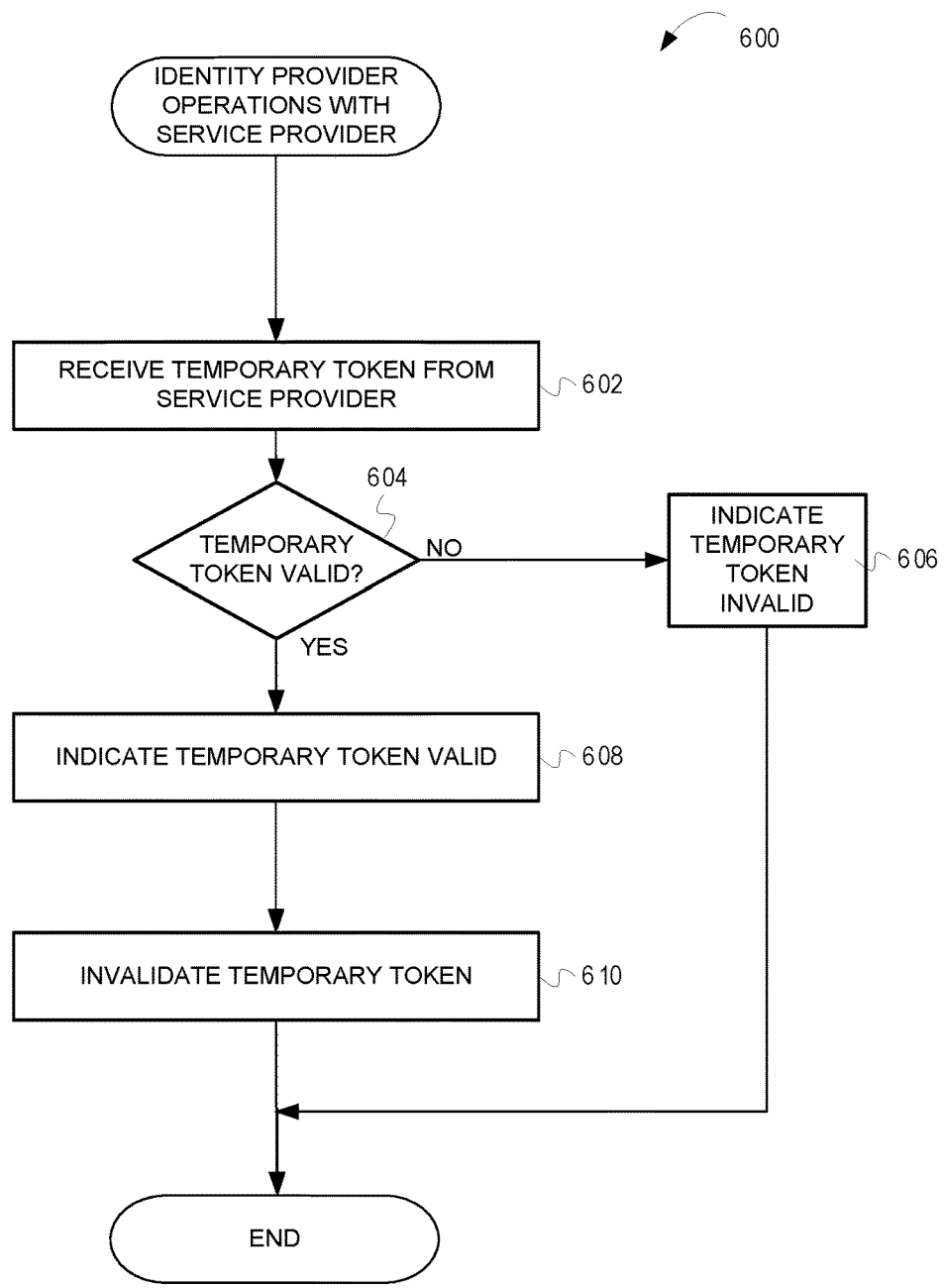
FIG. 6 is a flow chart illustrating operations performed by an identity provider with respect to a service provider in a method for exchanging tokens.

FIG. 6 is a flow chart 600 illustrating operations performed by an identity provider with respect to a service provider in a method for exchanging tokens. At block 602, the identity provider 106 receives a request to validate a temporary token. As an example, the identity provider 106 can receive a request to validate a temporary token from a service provider 104.

At decision block 604, the identity provider 106 determines if the temporary token is a valid. For example, the identity provider 106 can determine if the temporary token has already been used. Because the temporary token is a one-time use token, if the temporary token has already been used, it is no longer valid. Additionally, the identity provider 106 can determine if the temporary token has expired. If the temporary token is valid, then the method proceeds to block 608. If the temporary token is not valid, then the method proceeds to block 606, where the identity provider returns an indication to the requestor that the temporary token is not valid.

Block 608 is reached if the temporary token is valid. At block 608, the identity provider can provide an indication to the requestor that the temporary token is valid.

At block 610, the identity provider invalidates the temporary token. For example, the identity provider can update data indicating that the temporary token has been used, and is thus no longer valid. In addition, or alternatively, the identity provider 106 can force the temporary token to become expired. The method then ends.

Figure 7:
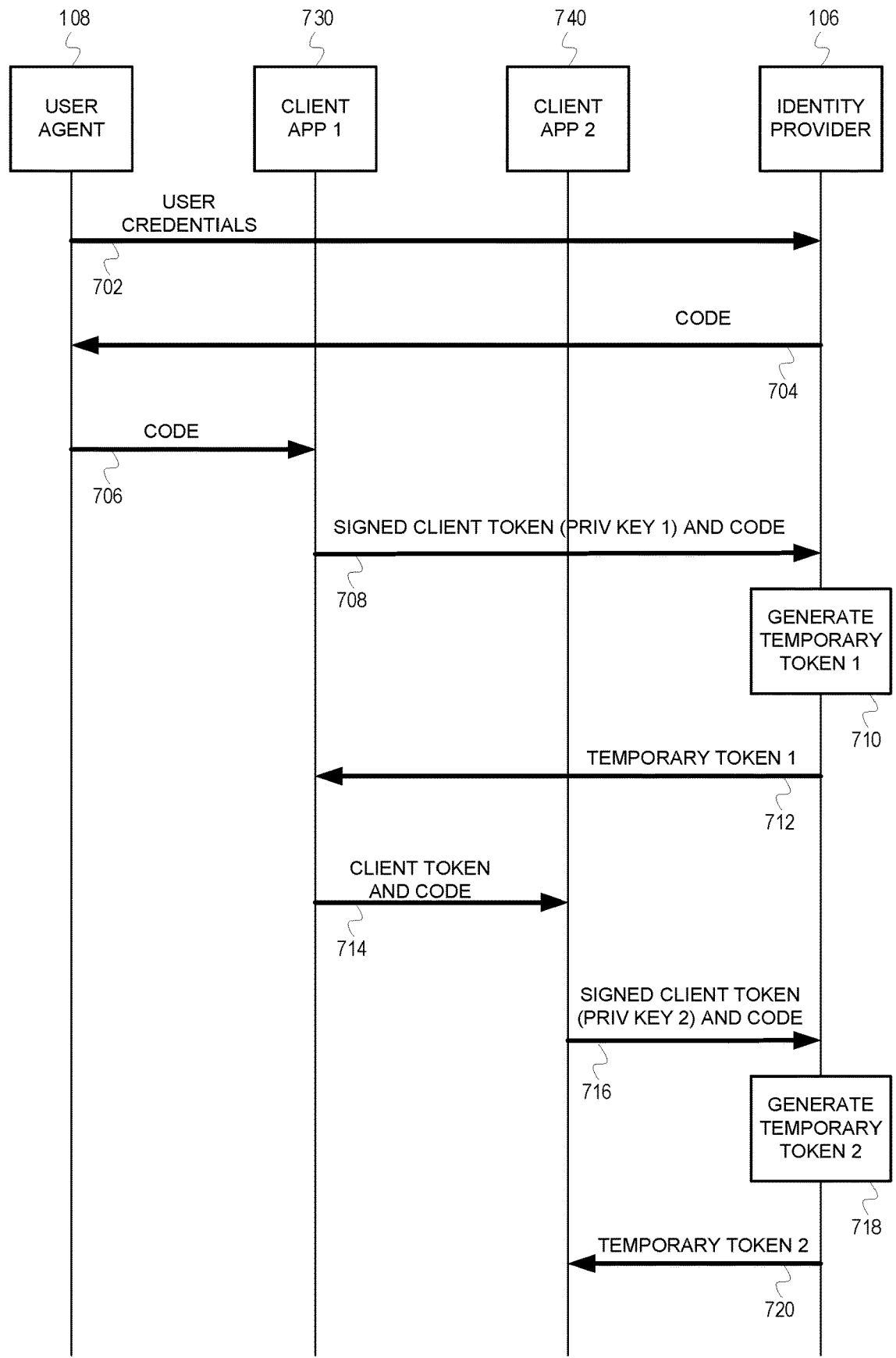
FIG. 7 is a sequence diagram illustrating a method for exchanging tokens with client generated tokens for two clients in a single session.

FIG. 7 is a sequence diagram illustrating a method for exchanging tokens with client generated tokens for two client applications, a first client application 730 and a second client application 740, in a single session. In this example, the first client application 730 and the second client application 740 are executing during a session for a single user that is associated with both client applications 730 and 740.

At operation 702, user credentials can be provided to an identity provider 106. As in FIG. 2, in some aspects, a first client application 730 can cause a user agent to be invoked, where the user agent provides a graphical user interface that provides one or more fields for a user to provide credentials. For example, a user can provide a user identifier and/or a password as user credentials via user agent 108.

At operation 704, the identity provider 106 generates a code and sends the code to the user agent 108 in response to receiving credentials at operation 702. The code can be generated as a random sequence of values. The identity provider 106 can store the code for later use in verifying the client.

At operation 706, the user agent 108 can provide the code to the first client application 730.

In alternative aspects, the identity provider 106 can provide the code directly to the first client application 730. In such implementations, operation 706 need not be performed.

In some aspects, operations 702-706 are performed once when the first client application 730 (potentially including a user agent 108 of a client 730) initially interacts with an identity provider 106. After receiving the code, operations 702-706 need not be repeated by client applications running within the same session. For example, a second client application 740 need not provide credentials to the identity provider 106 in order to receive temporary tokens.

At operation 708, the first client application 730 sends the client token and the code received at operation 704 to the identity provider 106. In some aspects, the first client application 730 can generate the client token and store the client token in an encrypted form for use in future temporary token requests. In further aspects, the first client application 730 can sign the client token that is sent to the identity provider 106 along with the code. For example, the first client application 730 can encrypt the token using a public certificate, and sign the message containing the encrypted token with a first private key associated with the first client application 730.

At operation 710, the identity provider 106 generates a first temporary token in response to receiving the first client token and verifying the code received from first client application 730 is the same code as sent to the client at operation 706 above. In some aspects, the identity provider 106 can verify the identity and authenticity of the request by verifying the signature of the request message using the public key of the first client application 730, and decrypting the first client token using the private key.

In some aspects, the first temporary token can be a one-time use token. In alternative aspects, the first temporary token can be limited for use during a specific brief time interval, for example, an interval of seconds or minutes from when the first temporary token was generated.

At operation 712, the identity provider 106 sends the first temporary token to the first client application 730.

At operation 714, the client application 730 shares the first client token and code with a second client application 740 that is running in the same session as the first client application 730.

At operation 716, the second client application 740 sends the first client token and the code received at operation 714 to the identity provider 106. In some aspects, the second client application 740 can sign the client token that is sent to the identity provider 106 along with the code. For example, the second client application 740 can encrypt the token using a public certificate associated with the second client application 740, and sign the message containing the encrypted token with a second private key associated with the second client application 740.

At operation 718, the identity provider 106 generates a second temporary token in response to receiving the client token and verifying the code received from client application 740 is the same code as sent to the first client application 730 at operation 706 above, thus verifying that the second client application 740 is running in a same session as the first client application 730 and is therefore authentic and authorized. In some aspects, the identity provider 106 can verify the identity and authenticity of the request by verifying the signature of the request message using the public key of the second client application 740, and decrypting the first client token using the second private key.

In some aspects, the second temporary token, like the first temporary token, can be a one-time use token. In alternative aspects, the second temporary token can be limited for use during a specific brief time interval, for example, an interval of seconds or minutes from when the second temporary token was generated.

At operation 720, the identity provider 106 sends the second temporary token to the second client application 740.

Operations 708 and 716 can be performed when first client application 730 and second client application 740 are to use the services of service providers. Operations 708-720 may be performed in an order different from that shown in FIG. 7. For example, client application 730 may share the client token and code with client application 740 after receiving the code at operation 706. Further, once the second client application 740 receives the client token and code, it may request a temporary token before client application 730 makes a request for a temporary token. Further, the operations of client application 730 and client application 740 may be interspersed with one another.

Those of skill in the art having the benefit of the disclosure will appreciate from the above that some embodiments can provide improved security of a computer system by avoiding security breaches in the computer system. The use of a temporary token along with the fact that the identity provider token and the information in the token is not shared with other entities makes it difficult for a malicious third party to gain access to the tokens and use the tokens to impersonate a user or to gain access to user credentials.

Variations

The above description refers to clients, services and providers. It should be noted that these roles can vary during the execution of an application or service. For example, a client 102 can be a client with respect to a service provider 104 and identity provider 106. However, the client 102 can also provide services to other applications and processes, and thus be a service provider with respect to such applications and processes. Similarly, a service provider may be a client with respect to other services.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 608 and 610 of FIG. 6 can be performed in parallel or concurrently, and can be performed in different orders. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
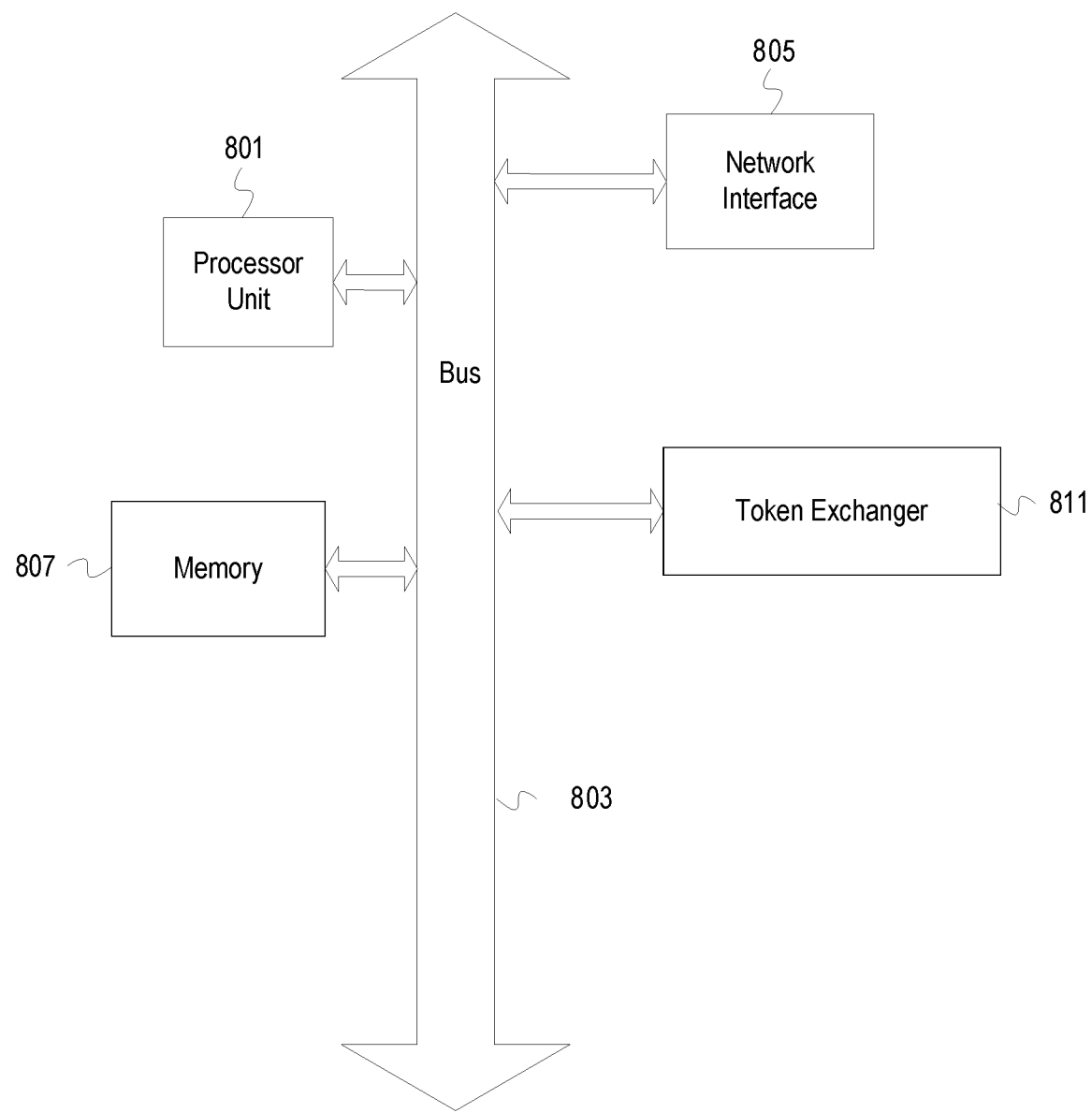
FIG. 8 depicts an example computer system configurable to exchange tokens, including client generated tokens.

FIG. 8 depicts an example computer system with a token exchange module. The computer system includes a processor unit 801 (possibly including multiple processors, multiple cores, multiple nodes, and/or implementing multithreading, etc.). The computer system includes memory 807.

The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes token exchanger 811. The token exchanger 811 can implement any or all of the token exchange methodologies described herein. For example, the token exchanger can be a client 102, a service provider 104, or an identity provider 106. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for exchanging tokens using a client generated token as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method for providing identity services, the method comprising:
   receiving credentials for a first client;
   in response to verifying the credentials:
      issuing a code to the first client, and
      generating an identity provider token, the identity provider token comprising information about the first client, wherein the identity provider token is not shared with the first client;
   receiving a request for a temporary token from the first client, the request including the code and a client token generated by the first client;
   generating the temporary token in response to validating the client token and the code, wherein validating the client token and the code comprises comparing information in the identity provider token with information in the client token; and
   providing the temporary token to the first client.

2. The method of claim 1, wherein the temporary token comprises a one-time use token.

3. The method of claim 1, further comprising:
   receiving, from a service provider, a request to validate the temporary token;
   in response to verifying that the temporary token is valid, providing a response to the service provider indicating the temporary token is valid; and
   invalidating the temporary token.

4. The method of claim 1, wherein validating the client token and the code comprises verifying a signature associated with the request using a public key of the first client.

5. The method of claim 1, wherein validating the client token and the code comprises decrypting the client token using a private key.

6. The method of claim 1, further comprising:
   receiving, from a second client, a request for a second temporary token, the request including the code and the client token generated by the first client; and
   in response to verifying that the code and the client token are valid, providing the second temporary token to the second client.

7. The method of claim 6, wherein the client token and the code are received by the second client from the first client.

8. The method of claim 1, further comprising configuring the temporary token to have an expiration time of less than five minutes.

9. The method of claim 1, wherein the temporary token is provided by the first client in a request to a service provider.

10. The method of claim 1, wherein generating the temporary token comprises storing data associated with the first client in the temporary token.

11. An apparatus comprising:
   a processor circuit; and
   a machine-readable medium comprising instructions executable by the processor circuit to cause the apparatus to,
      receive credentials for a client;
      in response to verification of the credentials:
         issue a code to the client, and
         generate an identity provider token, the identity provider token comprising information about the first client, wherein the identity provider token is not shared with the first client;
      receive the code and a client token generated by the client from the client;
      generate a temporary token in response to a validating the client token and the code, wherein validating the client token and the code comprises comparing information in the identity provider token with information in the client token;
      provide the temporary token to the client;
      receive, from a service provider, a request to validate the temporary token; and in response to verification that the temporary token is valid, provide a response to the service provider to indicate that the temporary token is valid and invalidate the temporary token.

12. The apparatus of claim 11, wherein the code and the client token are encrypted with one of a public or private key of a public/private key pair.

13. The apparatus of claim 11, wherein the instructions executable by the processor circuit further cause the apparatus to verify a signature associated with the request using a public key of the client.

14. The apparatus of claim 11, wherein the instructions executable by the processor circuit further cause the apparatus to:
  decrypt the client token using a private key; and
  verify that the code is associated with the client using information from the client token.

15. The apparatus of claim 11, wherein the temporary token is configured with an expiration time of less than five minutes.

16. One or more non-transitory machine-readable media comprising machine executable instructions for managing application risks, the machine executable instructions comprising instructions to cause a processor to:
  in response to verification of credentials received from a client:
    issue a code to the client, and
    generate an identity provider token, the identity provider token comprising information about the first client, wherein the identity provider token is not shared with the first client;
  receive the code and a client token generated by the client from the client;
  generate a temporary token in response to validating the code and the temporary token;
provide the temporary token to the client, wherein validating the client token and the code comprises comparing information in the identity provider token with information in the client token;
  receive a request to validate the temporary token; and
  in response to verification that the temporary token is valid, provide a response to the request indicating that the temporary token is valid, and invalidate the temporary token.

17. The one or more non-transitory machine-readable media of claim 16, wherein the temporary token comprises a one-time use token.

18. The one or more non-transitory machine-readable media of claim 16, wherein the code and the client token are encrypted with one of a public or private key of a public/private key pair.

19. The one or more non-transitory machine-readable media of claim 18, wherein the machine executable instructions to validate the code and the client token comprise instructions to:
  verify a signature associated with the request using a public key of the client; and
  decrypt the client token using a private key.

* * * * *